United States Patent
Matsukawa et al.

(10) Patent No.: US 10,876,624 B2
(45) Date of Patent: Dec. 29, 2020

(54) SHIFT CONTROL SYSTEM FOR SADDLE-TYPE VEHICLE

(71) Applicant: SUZUKI MOTOR CORPORATION, Hamamatsu (JP)

(72) Inventors: Tetsuro Matsukawa, Hamamatsu (JP); Hiromi Deguchi, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 119 days.

(21) Appl. No.: 16/283,309

(22) Filed: Feb. 22, 2019

(65) Prior Publication Data
US 2019/0264803 A1 Aug. 29, 2019

(30) Foreign Application Priority Data
Feb. 28, 2018 (JP) ................................. 2018-034786

(51) Int. Cl.
*F16H 63/18* (2006.01)
*F16H 59/68* (2006.01)
*B62M 25/06* (2006.01)

(52) U.S. Cl.
CPC ............. *F16H 59/68* (2013.01); *B62M 25/06* (2013.01); *F16H 63/18* (2013.01); *F16H 2059/6807* (2013.01); *F16H 2306/24* (2013.01)

(58) Field of Classification Search
CPC . F16H 2061/1212–1216; F16H 63/502; F16H 2061/1284; F16H 2059/6807; F16H 61/12; F16H 63/18; F16H 59/68; B62M 25/06; B60W 10/06–11
See application file for complete search history.

(56) References Cited

U.S. PATENT DOCUMENTS

| | | | |
|---|---|---|---|
| 2006/0096398 A1* | 5/2006 | Stengel | F16H 61/28 74/335 |
| 2007/0199755 A1* | 8/2007 | Takeuchi | F16D 48/06 180/221 |
| 2008/0105075 A1* | 5/2008 | Waerp | F16H 61/12 74/473.24 |
| 2008/0115984 A1* | 5/2008 | Watanabe | B60W 10/11 180/54.1 |
| 2008/0119324 A1 | 5/2008 | Watanabe | 477/109 |

(Continued)

FOREIGN PATENT DOCUMENTS

JP 2008-144755 A 6/2008

*Primary Examiner* — Ernesto A Suarez
*Assistant Examiner* — Lillian T Nguyen
(74) *Attorney, Agent, or Firm* — Stein IP, LLC (57) ABSTRACT

There is provided a shift control system for a saddle-type vehicle. A gear shift lever is configured to be operated by a driver. A gearshift sensor is configured to detect an operation on the gear shift lever. A shift cam is configured to rotate according to the operation on the gear shift lever. A gear position sensor is configured to detect a rotation angle of the shift cam. In the case where the gearshift sensor does not detect a detection result according to a detection result of the gear position sensor, or in the case where the gear position sensor does not detect a detection result according to a detection result of the gearshift sensor, a control device determines abnormality occurrence, and stops engine operation control based on the detection results of the gearshift sensor and the gear position sensor on the basis of the abnormality occurrence.

4 Claims, 8 Drawing Sheets

(56) References Cited

U.S. PATENT DOCUMENTS

2009/0031834 A1* 2/2009 Takeuchi ............... F16H 61/28
74/335
2019/0285172 A1* 9/2019 Maebashi ............... F16H 59/70

* cited by examiner

SHIFT CONTROL SYSTEM FOR SADDLE-TYPE VEHICLE

CROSS-REFERENCE TO RELATED APPLICATIONS

The disclosure of Japanese Patent Application No. 2018-034786 filed on Feb. 28, 2018, including specification, drawings and claims is incorporated herein by reference in its entirety.

TECHNICAL FIELD

The present disclosure relates to a shift control system for a saddle-type vehicle.

BACKGROUND

A motorcycle of Patent Document 1 has a transmission for transmitting torque which is produced by an engine according to the amount of operation on an accelerator to a drive wheel. Also, the motorcycle has a load sensor for detecting a driver's shifting operation on the transmission and giving the detection value to an ECU.

In Patent Document 1, if the driver performs an upshifting operation or a downshifting operation, the load sensor detects the load applied by the shifting operation, thereby detecting the shifting operation. When such a shifting operation has been detected, if the engine is operating, the ECU performs control such that the output of the engine decreases, whereby clutchless shifting in which shifting is possible without operating a clutch is performed.

Patent Document 1: Japanese Patent Application Publication No. 2008-144755

By the way, in Patent Document 1, if a breakdown occurs in the load sensor for detecting a transmission shifting operation, even when a shifting operation is not being preformed, it may be detected that a shifting operation is being performed. In this case, there is a problem that control for reducing the output of the engine is unnecessarily performed, which gives the driver a feeling of discomfort.

SUMMARY

It is therefore one of objects of the present disclosure to provide a shift control system for a saddle-type vehicle which can prevent unnecessary engine output control attributable to a breakdown of a gearshift sensor or a gear position sensor while using a shifting operation in which an operation on a clutch is not performed.

According to an aspect of the present disclosure, there is provided a shift control system for a saddle-type vehicle comprising: a gear shift lever configured to be operated by a driver; a gearshift sensor configured to detect an operation on the gear shift lever; a shift cam configured to rotate according to the operation on the gear shift lever; a gear position sensor configured to detect a rotation angle of the shift cam; and a control device configured to control an output of an engine on the basis of detection results of the gearshift sensor and the gear position sensor, wherein in the case where the gearshift sensor does not detect a detection result according to a detection result of the gear position sensor, or in the case where the gear position sensor does not detect a detection result according to a detection result of the gearshift sensor, the control device determines abnormality occurrence, and stops engine operation control based on the detection results of the gearshift sensor and the gear position sensor on the basis of the abnormality occurrence.

According to an aspect of the embodiments of the present disclosure, it is possible to prevent unnecessary engine output control attributable to a breakdown of a gearshift sensor or a gear position sensor while using a shifting operation in which an operation on a clutch is not performed.

DETAILED DESCRIPTION OF THE EMBODIMENTS

Hereinafter, an embodiment of the present disclosure will be described in detail with reference to FIG. 1 to FIG. 10 attached. Also, hereinafter, an example in which a transmission according to the present disclosure is applied to a motorcycle will be described; however, the application subject is not limited thereto, and can be changed. For example, the transmission according to the present disclosure can also be applied to other types of motorcycles, and saddle-type vehicles such as buggy type motor tricycles. Also, as for directions, the front side of the vehicle, the rear side of the vehicle, the left side of the vehicle, and the right side of the vehicle are indicated by an arrow FR, an arrow RE, an arrow L, and an arrow R, respectively. Also, in the drawings, for convenience of explanation, some components are not shown.

Figure 1:
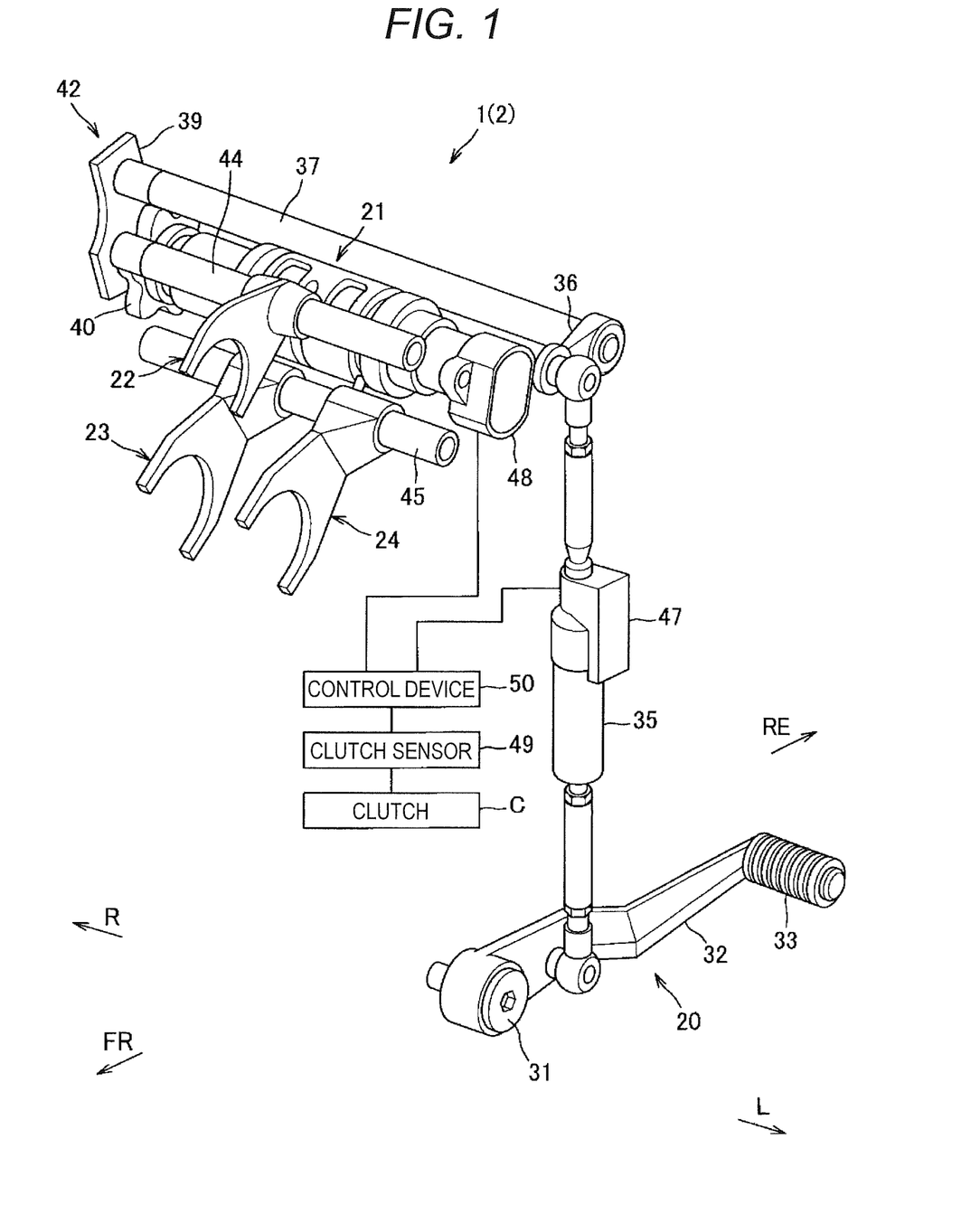
FIG. 1 is a perspective view illustrating a part of a transmission according to an embodiment.

The case where the transmission according to the present embodiment is configured with a so-called constant-mesh type 6-speed transmission in which gear parts of speed change gears provided in a counter shaft and a drive shaft are always in mesh with each other although not shown in the drawings can be taken as an example. FIG. 1 is a perspective view illustrating a part of the transmission according to the present embodiment. As shown in FIG. 1, in a transmission 1, some speed change gears are slid in the axial direction by a shifting mechanism 2 provided in a crankcase (not shown in the drawings) of an engine, whereby the assemblage (mesh) of the speed change gears is switched, whereby transmission shift operation is performed.

The shifting mechanism 2 includes a gear shift lever 20 which can be rotated by a driver, a shift cam (a shift drum) 21 which rotates according to an operation of rotating the gear shift lever 20, and a plurality of shift forks 22, 23, and 24 which can move in the axial direction (the left-right direction) according to rotation of the shift cam 21.

The gear shift lever 20 includes a lever part 32 extending from a shaft part 31 serving as a rotary shaft, and a pedal part 33 protruding leftward from the rear end of the lever part 32. The shaft part 31 is formed so as to protrude sideward from the crankcase such that the left-right direction becomes the axial direction, and is configured such that the gear shift lever 20 can swing up and down on the shaft part 31.

On the gear shift lever 20, a link rod 35 is attached as a part of a link mechanism for transmitting the operation of the gear shift lever 20 to a shift shaft 37. The link rod 35 extends substantially in the vertical direction, and its lower end is connected to the gear shift lever 20. Specifically, the lower end of the link rod 35 is supported on one side of a part on the base end side of the gear shift lever 20 which is a part of the lever part 32 positioned on the rear side from the shaft part 31 (i.e. positioned closer to the pedal part 33 than the shaft part is).

To the leading end¥ of the link rod 35, one end of a shaft link 36 is connected so as to be able to swing. In the present embodiment, the link rod 35 and the shaft link 36 are referred to collectively as the link mechanism. The other end of the shaft link 36 is fixed to the shift shaft 37. In this way, the shaft link 36 and the shift shaft 37 are configured to be able to rotate integrally with each other.

The shift shaft 37 extends in the width direction (left-right direction) of the vehicle, and to the right end part of the shift shaft 37, a shift cam drive plate 39 is fixed. Further, in the vicinity of the shift shaft 37, the shift cam 21 having a cylindrical shape is provided so as to extend in the width direction of the vehicle. To the right end part of the shift cam 21, a shift cam plate 40 is fixed.

Figure 2A:
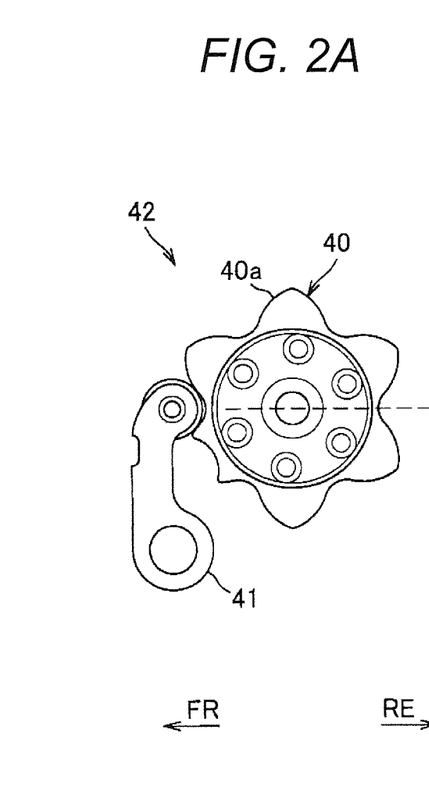
FIG. 2A is a right view of a positioning mechanism.

FIG. 2A is a right view of a positioning mechanism. As shown in FIG. 2A, the shift cam plate 40 has six protrusions 40a formed outward from the outer circumference of the circular plate, in a flower petal shape as seen in a side view. Into the groove parts between neighboring protrusions 40a, a shift cam stopper 41 to which a biasing force is applied by a spring member (not shown in the drawings) is engaged, whereby the position of the shift cam plate 40 and the shift cam 21 in the rotation direction is determined. In the present embodiment, the shift cam plate 40, the spring member, and the shift cam stopper 41 are referred to collectively as a positioning mechanism 42.

Figure 2B:
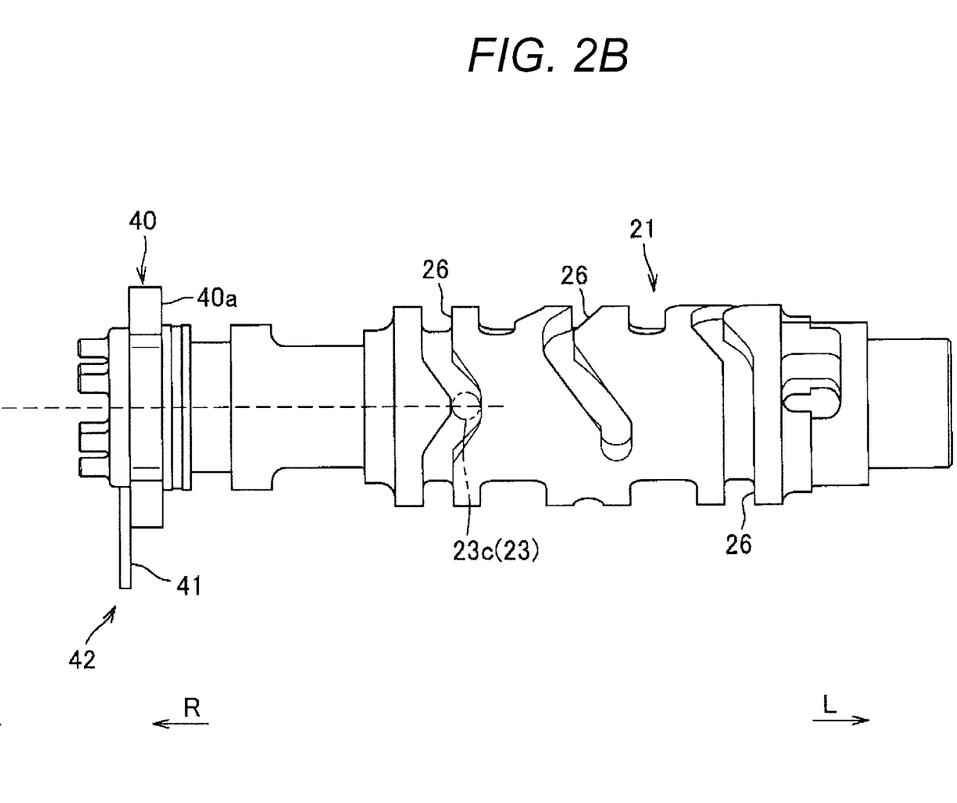
FIG. 2B is a front view of the positioning mechanism.

FIG. 2B is a front view of the positioning mechanism. As shown in FIG. 2B, the drum surface of the shift cam 21 has three lead grooves 26 extending in the circumferential direction of the shift cam 21. The lead grooves 26 have a constant width in the axial direction, and parts of the shift forks 22 to 24 are fit into the lead grooves 26, respectively.

Referring to FIG. 1 again, on the front side of the shift cam 21, two fork shafts 44 and 45 for supporting the shift forks 22 to 24 are installed side by side in the vertical direction. The fork shafts 44 and 45 extend in the vehicle width direction similarly to the shift cam 21. On the fork shaft 44, one shift fork 22 is fit so as to be able to slide in the axial direction, and on the fork shaft 45, two shift forks 23 and 24 are fit so as to be able to slide in the axial direction.

Figure 3:
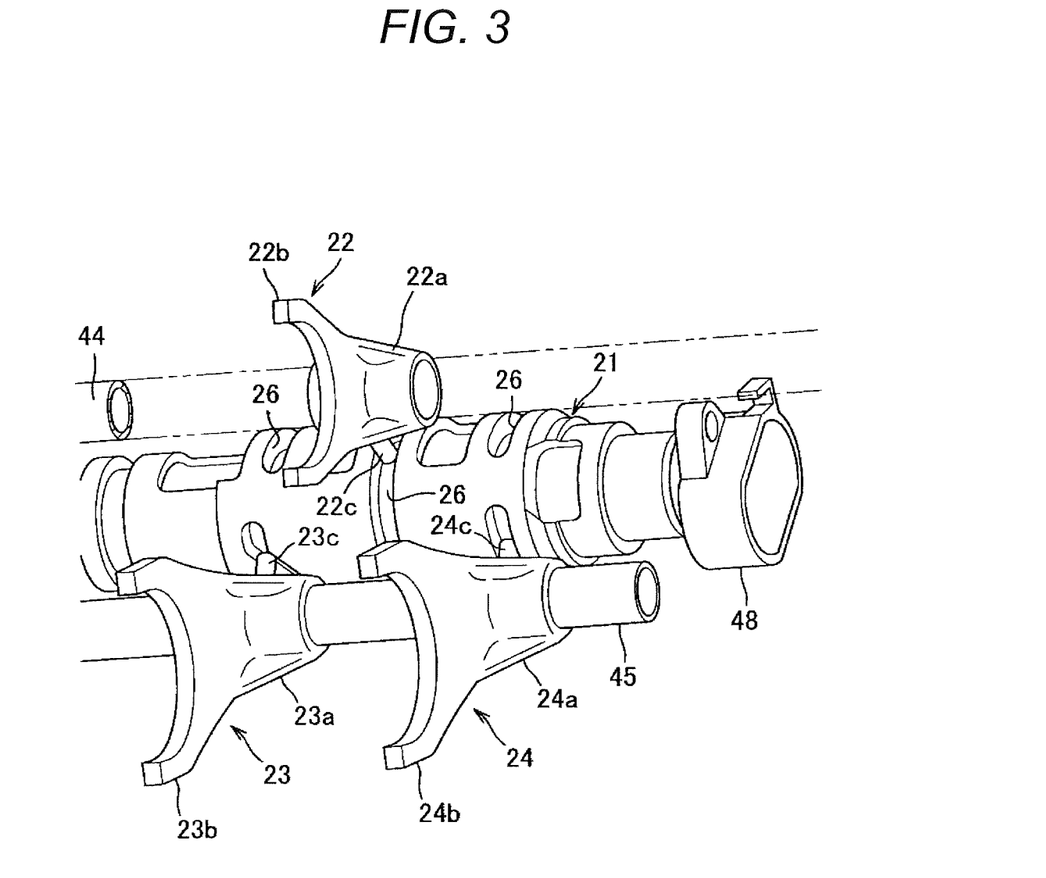
FIG. 3 is an enlarged perspective view of a shifting mechanism as seen from an angle different from that of FIG. 1.

FIG. 3 is an enlarged perspective view of the shifting mechanism as seen from an angle different from that of FIG. 1. As shown in FIG. 3, the shift forks 22 to 24 have cylindrical base parts 22a, 23a, and 24a into which the fork shafts 44 and 45 are fit, and fork parts 22b, 23b, and 24b each of which has two prongs extending frontward from the base part 22a, 23a, or 24a. Also, the outer surfaces of the base parts 22a, 23a, and 24a have protrusions 22c, 23c, and 24c protruding toward the shift cam 21. The protrusions 22c, 23c, and 24c are fit in the above-mentioned lead grooves 26. The leading ends of the fork parts 22b, 23b, and 24b are engaged with some of the speed change gears (not shown in the drawings), such that by sliding the shift forks 22 to 24, it possible to slide the gear parts of the speed change gears in parallel with the sliding direction of the shift forks.

Figure 4:
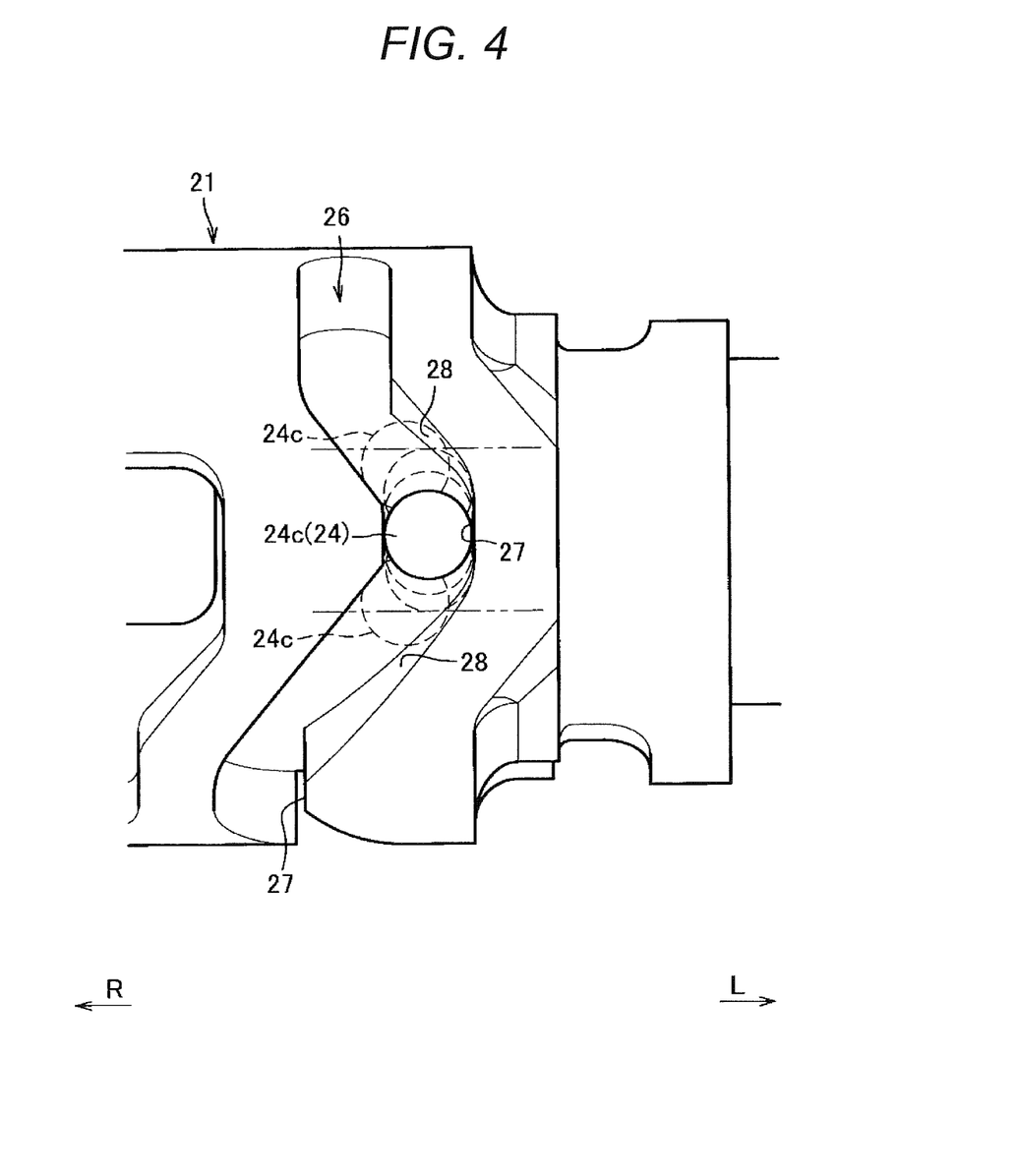
FIG. 4 is an enlarged view of a part of a shift cam of FIG. 2B.

Hereinafter, with reference to FIG. 4, the positional relationship between a lead groove 26 and the protrusion 22c of the shift fork 22 set at a certain shift position will be described. FIG. 4 is an enlarged view of a part of the shift cam of FIG. 2B. Herein, a description will be made taking, as an example, the case in which the shift fork 24 is shifted in the left-right direction if the shift cam 21 is rotated in any one direction of the upshifting direction and the downshifting direction from a certain shift position. As shown in FIG. 4, the lead groove 26 has maintaining sections (straight parts) 27 extending in parallel with the rotation direction of the shift cam 21, and shift sections (inclined parts) 28 slightly inclined to the axial direction with respect to the rotation direction.

In a state where the protrusion 24c of the shift fork 24 is disposed in (engaged with) the center part in the extension direction of a maintaining section 27 of the lead groove 26, the position of the shift cam 21 in the rotation direction is determined by the biasing force of the spring member of the positioning mechanism 42. Even though the shift cam 21 rotates from this state by a certain angle, in the initial stage of the rotation, as shown by dotted lines in FIG. 4, the protrusion 24c is positioned in the maintaining section 27, so the position of the protrusion 24c (the shift fork 24) in the left-right direction is maintained without shifting. Therefore, the sections extending on both sides from the center part of the maintaining section 27 in the extension direction are referred to as so-called play sections. In a rotation angle range of the shift cam 21 in which the protrusion 24c is disposed in such a play section, while the shift position is maintained without changing, rotation of the shift cam 21 is allowed.

If the shift cam 21 is further rotated such that the protrusion 24c passes through the maintaining section 27 and is disposed in a shift section 28, the protrusion 24c can slide along the shift section 28. As a result, the shift fork 24 is shifted in the left-right direction (to the right side in the drawing) along the formation position of the shift section 28, and the speed change gear engaged with the shift fork 24 is shifted in the same direction. After passing through the shift section 28, the protrusion 24c is disposed in the closest shift-position maintaining section 27, whereby transmission shift (speed change) using the shift fork 24 is completed.

Although a part of one lead groove 26 of the three lead grooves 26 has been described above, every lead groove 26 has maintaining sections 27 and shift sections 28 appropriately formed. Specifically, at positions for shifting the shift forks 22 to 24 in order to perform transmission shift, the shift sections 28 for shifting the protrusions 22c, 23c, and 24c of the shift forks 22 to 24 in the left-right direction are formed. In a state where the position of the shift cam 21 in the rotation direction has been determined by the positioning mechanism 42, the protrusions 22c, 23c, and 24c are engaged with the center parts of the protrusions 22c, 23c, and 24c.

Figure 5:
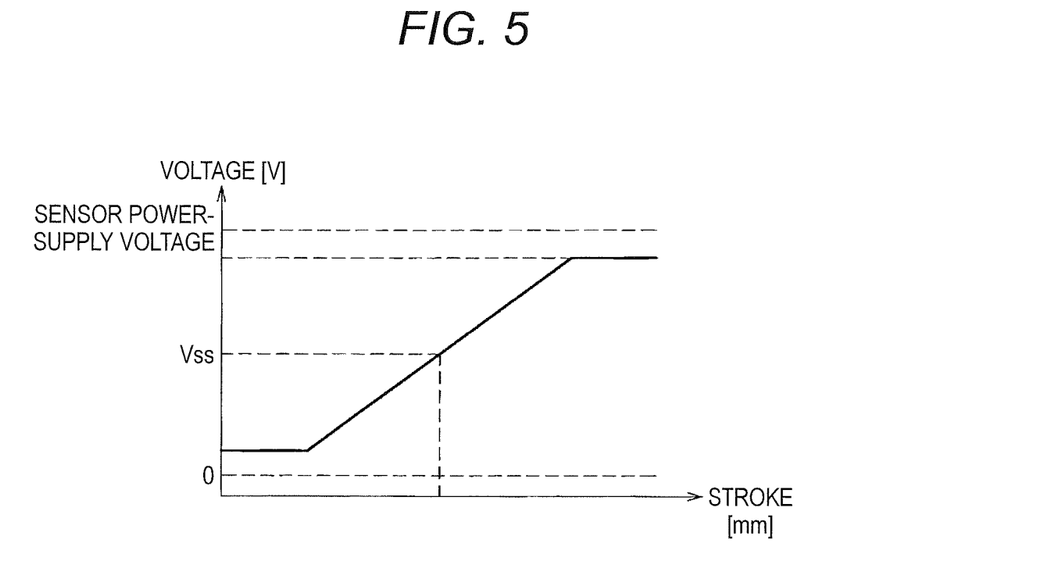
FIG. 5 is a graph illustrating the output characteristic of a gearshift sensor.

Referring to FIG. 1 again, on the link rod 35, a gearshift sensor 47 for detecting the operation of the gear shift lever 20 is attached. The gearshift sensor 47 is configured with a load cell which can extend and contract according to the load which is applied to the link rod 35 when the gear shift lever 20 is operated and detect the stroke amount based on such extension and contraction by converting the stroke amount into a voltage signal, and so on. FIG. 5 is a graph illustrating the output characteristic of the gearshift sensor. As shown in FIG. 5, the output voltage of the gearshift sensor 47 increases as the stroke of the link rod 35 lengthens.

Figure 6:
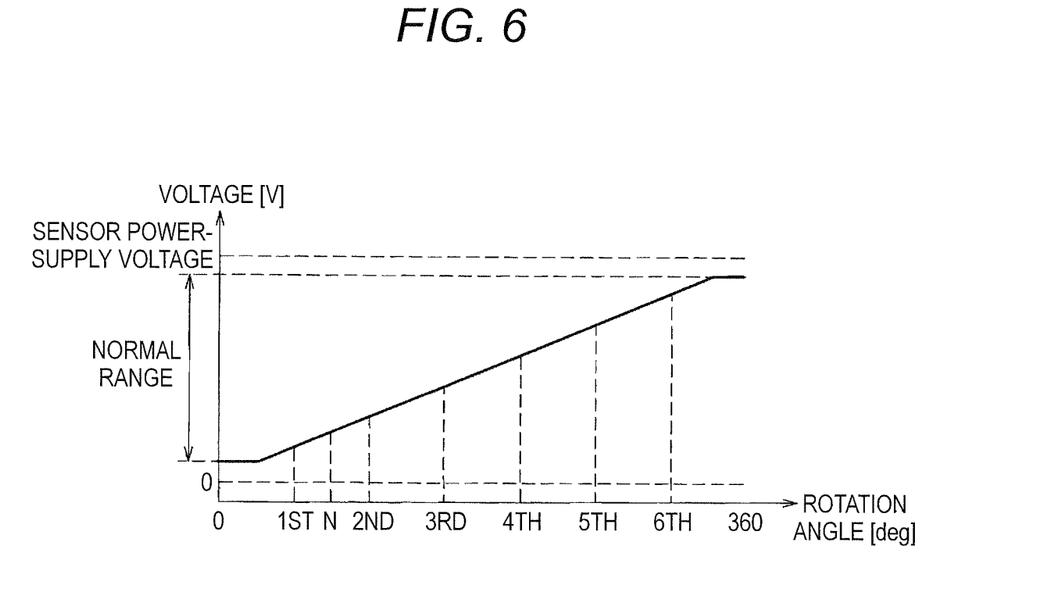
FIG. 6 is a graph illustrating the output characteristic of a gear position sensor.

Also, on the left end side of the shift cam 21, a gear position sensor 48 is attached. The gear position sensor 48 is configured with a position meter for detecting the rotation angle of the shift cam 21 by converting the rotation angle into a voltage signal. FIG. 6 is a graph illustrating the output characteristic of the gear position sensor. As shown in FIG. 6, the output voltage of the gear position sensor 48 increases as the rotation angle of the shift cam 21 increases with upshifting.

Also, a clutch sensor 49 for detecting whether a clutch C for connecting the power of the engine to the drive wheel or disconnecting the power from the drive wheel is in the connection state is provided.

Referring to FIG. 1 again, the gearshift sensor 47, the gear position sensor 48, and the clutch sensor 49 are electrically connected to a control device 50, and outputs their detection results to the control device 50. The control device 50 is configured with, for example, an ECU (Electronic Control Unit). The ECU is a computer which is configured to include a CPU, a ROM, a RAM, and so on. The control device 50 controls the operation of the engine according to the detection results of various sensors including the gearshift sensor 47 and the gear position sensor 48. In other words, the control device 50 monitors the outputs of the gearshift sensor 47 and the gear position sensor 48, and performs control on the basis of variations in the outputs such that the output of the engine is adjusted.

The control device 50 determines whether the voltage which is output from the gearshift sensor 47 exceeds a defined value Vss which is a threshold shown in the graph of FIG. 5. The case where the output voltage of the gearshift sensor 47 becomes the defined value Vss is the case where since an operation force (operation amount) required for transmission shift has been applied from the driver, the protrusion 23c of the shift fork 23 is disposed at the boundary position between the maintaining section 27 of FIG. 4 and a shift section 28. Therefore, a state where the protrusion 23c is disposed in the maintaining section 27 is a state where an operation force sufficient for transmission shift has not been applied to the gear shift lever 20. Therefore, in this state, the gearshift sensor 47 does not detect the operation performed on the gear shift lever 20 as an operation for transmission shift. In other words, the output voltage of the gearshift sensor 47 equal to or smaller than the defined value Vss is considered as being within a range in which an operation for transmission shift should not be detected.

Figure 7:
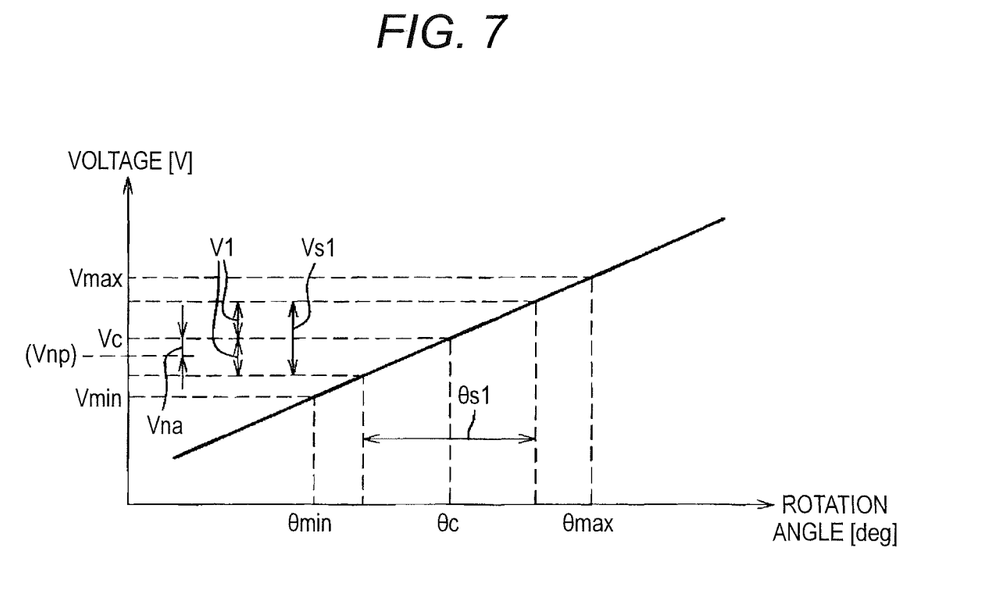
FIG. 7 is a graph for explaining the graph of FIG. 6 in more detail.
Figure 8:
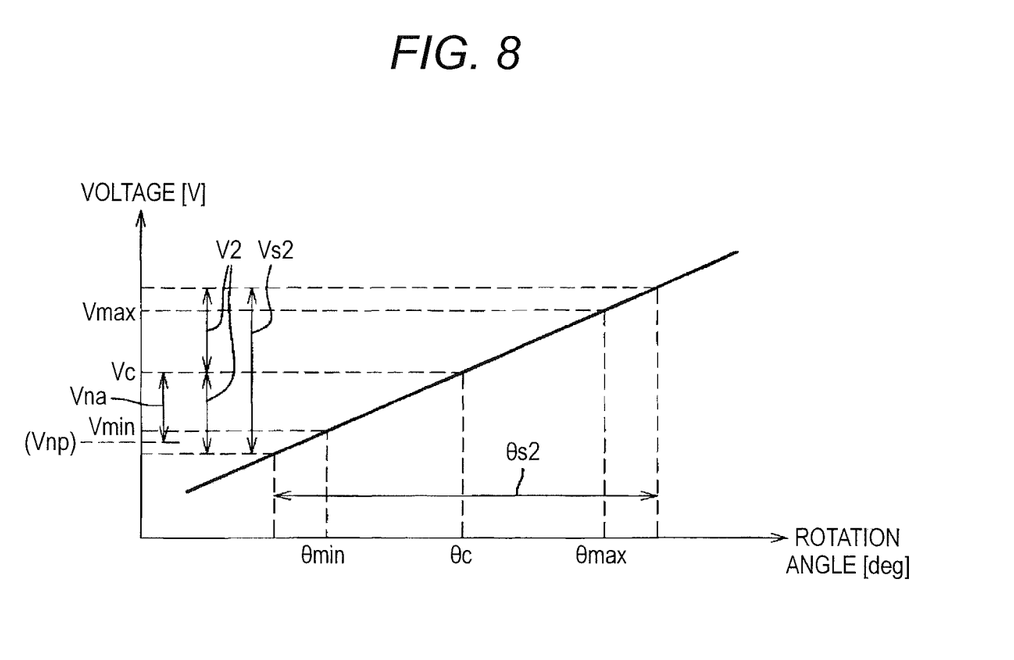
FIG. 8 is a graph for explaining the graph of FIG. 6 in more detail.

In the control device 50, the output voltages of the gear position sensor 48 at individual gear positions shown in FIG. 6 are stored in advance. Specifically, as shown in FIG. 7 and FIG. 8, with respect to each gear position, a middle voltage Vc corresponding to a middle rotation angle θc at which the protrusions are positioned at the center parts of the maintaining sections 27 is stored in advance. Also, a first threshold V1 (see FIG. 7) and a second threshold V2 (see FIG. 8) (to be described below) to be used to determine breakdowns of the gearshift sensor 47 and the gear position sensor 48 are stored in advance. The first threshold V1 and the second threshold V2 are considered as being relative values to the middle voltage Vc.

In the transmission 1 which is configured as described above, if the gear shift lever 20 is operated by the driver who needs to perform transmission shift, according to the operation, the shift shaft 37 is rotated. The rotation of the shift shaft 37 is transmitted to the shift cam plate 40 via the shift cam drive plate 39. The shift cam plate 40 is rotated against the biasing force of the spring member connected to the shift cam stopper 41. At this time, the shift cam stopper 41 engaged with a certain groove part passes the tip of a protrusion 40a, and gets into the next groove part, whereby rotation of the shift cam plate 40 is regulated. Therefore, the shift cam plate 40 can be rotated by a certain angle. According to this configuration, the shift cam plate 40 can intermittently rotate.

With rotation of the shift cam plate 40 attributable to the operation on the gear shift lever 20, the shift cam 21 is rotated together. At this time, the protrusions 22c, 23c, and 24c of the shift forks 22 to 24 are slid along the lead grooves 26. Further, when the protrusions 22c, 23c, and 24c slide along the shift sections 28 inclined with respect to the axial direction, the shift forks 22 to 24 are slid in the axial direction. As a result, at least some of the plurality of speed change gears are slid in the axial direction, and the assemblage of the speed change gears for transmitting power is switched, whereby transmission shift is performed.

When the gear shift lever 20 is operated, the gearshift sensor 47 detects the load (stroke) applied to the link rod 35, and the detection result is output to the control device 50. In the control device 50, the voltage signal which is the detection result of the gearshift sensor 47 and the defined value Vss (see FIG. 5) set and stored in advance are compared. If the detection result of the gearshift sensor 47 exceeds the defined value Vss, it is determined that a transmission shift operation has been performed. According to this determination, the control device 50 performs control such that the output of the engine decreases, whereby transmission shift is realized by a quick shifting operation in which a clutch connection/disconnection operation is not performed by the driver.

Also, as examples of engine output control, control which is performed to adjust the degree of throttle opening of a throttle valve installed on an intake pipe connected to the engine on the basis of a detection value of an accelerator opening sensor, ignition stop or ignition timing retardation control on an ignition valve can be taken. By such control, it is possible to realize smooth transmission shift.

Figure 9:
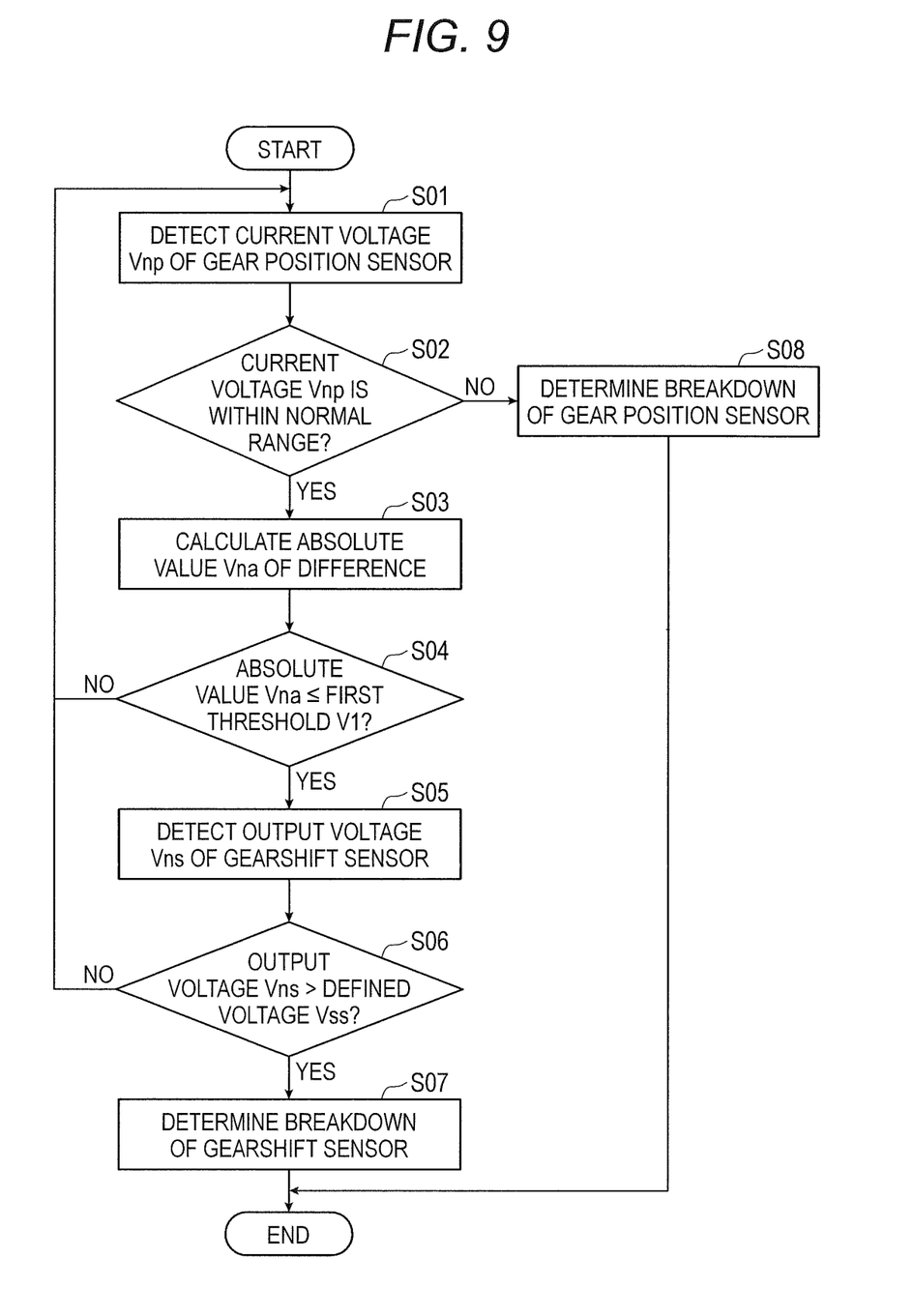
FIG. 9 is a flow chart illustrating the flow of a method of determining whether the gearshift sensor is broken.
Figure 10:
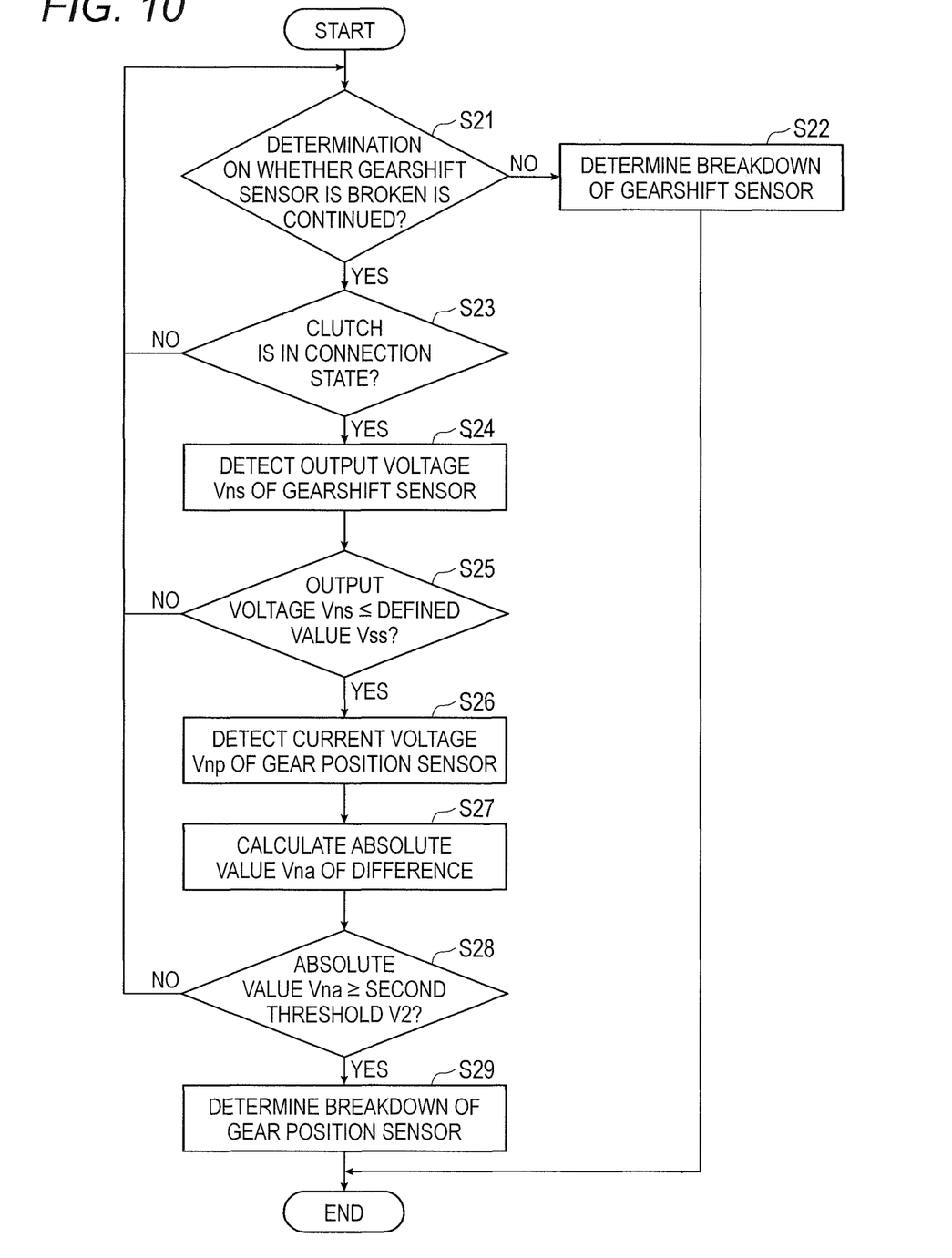
FIG. 10 is a flow chart illustrating the flow of a method of determining whether the gear position sensor is broken.

Now, methods of determining whether the gearshift sensor 47 or the gear position sensor 48 is broken according to the present embodiment will be described with reference to FIG. 9 and FIG. 10. FIG. 9 is a flow chart illustrating the flow of the method of determining whether the gearshift sensor is broken. FIG. 10 is a flow chart illustrating the flow of the method of determining whether the gear position sensor is broken.

[Method of Determining Whether Gearshift Sensor 47 is Broken]

For this method, as shown in FIG. 7, with respect to each shift position, a middle voltage Vc corresponding to a middle rotation angle θc is stored in advance. Also, with respect to each shift position, an angle range θs1 of the shift cam 21 in which it is possible to stably detect that the protrusions 22c, 23c, and 24c are located in the maintaining sections 27 is set in advance in view of detection errors of the gear position sensor 48 attributable to its individual specificity. Further, an output voltage range corresponding to the angle range θs1 is stored as a defined range Vs1 in advance. The defined range Vs1 has a value obtained by subtracting a first threshold V1 from the middle voltage Vc, as the minimum value, and has a value obtained by adding the first threshold V1 to the middle voltage, as the maximum value, and the first threshold V1 also is stored. When output voltages corresponding to a minimum rotation angle θmin and a maximum rotation angle θmax in the same maintaining sections 27 are referred to as a minimum voltage Vmin and a maximum voltage Vmax, the first threshold V1 is set to be equal to or smaller than the absolute values of the differences between the middle voltage Vc and either the minimum voltage Vmin or the maximum voltage Vmax.

As shown in FIG. 9, in the method of determining whether the gearshift sensor 47 is broken, first, a current voltage Vnp is detected as the current output voltage of the gear position sensor 48 attributable to the rotation angle of the shift cam 21 (STEP (hereinafter, referred to as "S") 01). Next, in order to determine whether the gear position sensor 48 normally operates, whether the current voltage Vnp is within a normal range shown in FIG. 6 is determined (S02).

In the case where it is determined that the current voltage Vnp is within the normal range ("Yes" in S02), the absolute value Vna of the difference between the current voltage Vnp and the middle voltage Vc corresponding to the maintaining sections 27 corresponding to the current shift position obtained from the current voltage Vnp is calculated (S03). Subsequently, the absolute value Vna and the first threshold V1 are compared (S04).

In the case where the absolute value Vna is larger than the first threshold V1 (Vna>V1) ("No" in S04), it is determined that the shift cam 21 has rotated by such an angle that transmission shift is possible, and a process of returning to S01 is performed, and the breakdown determination is continued. In the case where the absolute value Vna is equal to or smaller than the first threshold V1 (Vna≤V1) ("Yes" in S04), it is determined that the shift cam 21 has not sufficiently rotated and transmission shift is impossible, and the current output voltage Vns of the gearshift sensor 47 is detected (S05).

After S05, the current output voltage Vns of the gearshift sensor 47 and the defined voltage Vss are compared (S06). In the case where the output voltage Vns is larger than the defined voltage Vss (Vns>Vss) ("Yes" in S06), it is determined that an abnormality such as a breakdown has occurred in the gearshift sensor 47 (S07). In other words, although it is determined in S04 that transmission shift is impossible, if it is determined in S06 on the basis of the detection result of the gearshift sensor 47 that the operation force required for transmission shift has been applied to the gear shift lever 20, it is determined that an abnormality has occurred in the gearshift sensor 47. In this case, the control device 50 stops the engine output control based on the detection results of the gearshift sensor 47 and the gear position sensor 48, and controls the output of the engine on the basis of the detection results of other sensors and driver's operations.

In the case where the output voltage Vns is equal to or smaller than the defined voltage Vss (Vns≤Vss) ("No" in S06), it is determined that an operation capable of transmission shift has not been performed on the gearshift sensor 47. In other words, in the case where it is determined in S04 that transmission shift is impossible, and it is determined in S06 on the basis of the detection result of the gearshift sensor 47 that the transmission shift is unnecessary, it is determined that the gearshift sensor 47 is normal. Therefore, a process of returning to S01 is performed, and the breakdown determination is continued.

Meanwhile, in the case where it is determined in S02 that the current voltage Vnp is not within the normal range ("No" in S02), it is determined that the gear position sensor 48 is broken (S08).

In this method of determining whether the gearshift sensor 47 is broken, in S04, whether the absolute value Vna is equal to or smaller than V1, or not, i.e. whether the protrusions 22c, 23c, and 24c of the shift forks 22 to 24 are located in the maintaining sections 27 is determined. In the case where it is determined that the protrusions are located in the maintaining sections 27, if the gearshift sensor 47 is normal, in response to an operation force insufficient for transmission shift, an output equal to or smaller than the defined value Vss should be obtained. For this reason, in the case where an output larger than the defined value Vss is detected, it is possible to determine that a breakdown has occurred. In other words, in the case where the current voltage Vnp of the gear position sensor 48 is within the defined range Vs1, the gearshift sensor 47 should output a voltage equal to or smaller than the defined value Vss. For this reason, if the gearshift sensor 47 does not do it, it is possible to determine a breakdown (occurrence of an abnormality). Also, in the case where determination on the output voltage Vns of the gearshift sensor 47 is performed in S06, since the protrusions 22c, 23c, and 24c are located in the maintaining sections 27, even though the shift cam 21 rotates, it is possible to prevent the shift forks 22 to 24 from shifting in the axial direction, such that transmission shift is not performed.

[Method of Determining Whether Gear Position Sensor 48 is Broken]

For this method, as described above, a middle voltage Vc corresponding to each middle rotation angle θc is stored in advance as shown in FIG. 8. Also, with respect to each gear position, an angle range θs2 slightly wider than the width of the formation positions of maintaining sections 27 is set in advance in view of detection errors of the gear position sensor 48 attributable to its individual specificity. Further, an output voltage range corresponding to the angle range θs2 is stored as a defined range Vs2 in advance. The defined range Vs2 has a value obtained by subtracting a second threshold V2 from the middle voltage Vc, as the minimum value, and has a value obtained by adding the second threshold V2 to the middle voltage, as the maximum value, and the second threshold V2 also is stored. The second threshold V2 is set to be equal to or smaller than the absolute values of the differences between the middle voltage Vc and either the minimum voltage Vmin or the maximum voltage Vmax.

As shown in FIG. 10, in the method of determining whether the gear position sensor 48 is broken, first, in order to whether the gearshift sensor 47 is normally operating, whether the above-described determination on whether the gearshift sensor 47 is broken is being continued is determined (S21).

In the case where determination on whether the gearshift sensor 47 is broken is not being continued ("No" in S21), it is determined that the gearshift sensor 47 is broken (S22), and as described above, the engine output control is stopped without performing the following determination on whether the gear position sensor 48 is broken. In the case where determination on whether the gearshift sensor 47 is broken is being continued ("Yes" in S21), on the basis of the output of the clutch sensor 49, whether the clutch C usable for power transmission of the transmission 1 is in the connection state is determined (S23).

In the case where the clutch is not in the connection state ("No" in S23), a process of returning to S21 is performed, and the breakdown determination is continued. In the case where the clutch is in the connection state ("Yes" in S23), the current voltage Vnp of the gearshift sensor 47 is detected (S24), and the output voltage Vns and the defined value Vss are compared (S5).

In the case where the output voltage Vns is larger than the defined value Vss (Vns>Vss) ("No" in S25), it is detected that an operation capable of transmission shift has been performed on the gearshift sensor 47, and a process of returning to S21, and the breakdown determination is continued.

In the case where the output voltage Vns is equal to or smaller than the defined value Vss (Vns≤Vss) ("Yes" in S25), it is determined that an operation force capable of transmission shift has not been applied to the gearshift sensor 47. In this case, the current voltage Vnp (see FIG. 8) is detected as the current output voltage of the gear position sensor 48 based on the rotation angle of the shift cam 21 (S26). Moreover, the absolute value Vna (see FIG. 8) of the difference between the current voltage Vnp and the middle voltage Vc corresponding to the maintaining sections 27 corresponding to the current shift position obtained from the current voltage Vnp is calculated (S27). Subsequently, the absolute value Vna and the second threshold V2 are compared (S28).

In the case where the absolute value Vna is smaller than the second threshold V2 (Vna<V2) ("No" in S28), it is determined that the protrusions 22c, 23c, and 24c are located in the maintaining sections 27 corresponding to the current shift position and transmission shift will not be performed. In this way, if it is determined in S25 on the basis of the detection result of the gearshift sensor 47 that transmission shift is unnecessary, and it is determined in S28 on the basis of the detection result of the gear position sensor 48 that transmission shift is not performed, it is determined that the gear position sensor 48 is normal. Therefore, a process of returning to S21 is performed, and the breakdown determination is continued.

In the case where the absolute value Vna is equal to or larger than the second threshold V2 (Vna≤V2) ("Yes" in S28), it is determined that the protrusions 22c, 23c, and 24c have been shift from the maintaining sections 27 corresponding to the current shift position to shift sections 28, and transmission shift is performed. In this way, although it is determined in S25 on the basis of the detection result of the gearshift sensor 47 that transmission shift is unnecessary, it is determined in S28 on the basis of the detection result of the gear position sensor 48 that transmission shift is performed. Due to such a difference between the detection results, it is determined that an abnormality such as a breakdown has occurred in the gear position sensor 48 (S29). Even in this case, the control device 50 stops the engine output control based on the detection results of the gearshift sensor 47 and the gear position sensor 48, and controls the output of the engine on the basis of the detection results of other sensors and driver's operations.

In this method of determining whether the gear position sensor 48 is broken, in S25, whether the output voltage Vns of the gearshift sensor 47 is equal to or smaller than the defined value Vss, or not, i.e. whether an operation required for transmission shift has been performed on the gear shift lever 20 is determined. In the case where it is determined that an operation has not been performed, in S28, whether the absolute value Vna is equal to or larger than the second threshold V2, or not, i.e. whether the protrusions 22c, 23c, and 24c of the shift forks 22 to 24 have shifted from the maintaining sections 27 to shift sections 28 is determined. In the case where the gear position sensor 48 is normal, it should be determined that the protrusions 22c, 23c, and 24c have not arrived at shift sections 28. Therefore, if it is determined that the protrusions have arrived at shift sections 28 (the absolute value Vna is larger than the second threshold V2), it is possible to determine that a breakdown has occurred. In other words, in the case where the output voltage Vns of the gearshift sensor 47 is equal to or smaller than the defined value Vss, the gear position sensor 48 should output a detection result representing that the protrusions 22c, 23c, and 24c are located in the maintaining sections 27. For this reason, if the gear position sensor 48 does not do it, it is possible to determine a breakdown (occurrence of an abnormality).

According to the above-described embodiment, since it is possible to determine breakdowns of the gearshift sensor 47 and the gear position sensor 48, it is possible to prevent transmission shift from being detected when transmission shift is not being performed by the driver. Also, it is possible to prevent it from being detected that transmission shift is not being performed when the driver is performing transmission shift. Therefore, even in the case of using a quick shift operation in which an operation on the clutch is not performed by the driver, it is possible to prevent control for unnecessarily adjusting the output of the engine, so it is possible to prevent a feeling of discomfort from being given to the driver.

Also, since breakdown determination is commonly performed on the gearshift sensor 47 and the gear position sensor 48, it is possible to improve the accuracy of determination as compared to the case of performing determination on each of them. Moreover, if a breakdown occurs, control based on the gearshift sensor 47 and the gear position sensor 48 is stopped. Therefore, by this, it is possible to prevent a feeling of discomfort from being given to the driver.

Also, as described above, breakdown determination is performed on both of the gearshift sensor 47 and the gear position sensor 48, and if any one is broken, control based on the detection results of them is stopped. Therefore, the possibility that due to a breakdown of one of them, the other will be broken decreases significantly. Therefore, it is possible to avoid the case where both of the gearshift sensor 47 and the gear position sensor 48 are broken at the same time, whereby it becomes impossible to perform breakdown determination on them. Therefore, it is possible to more reliably prevent a feeling of discomfort from being given to the driver.

Also, in the breakdown determination on the gear position sensor 48, under the condition that the clutch C should be in the connection state, abnormality occurrence determination is performed. Therefore, it is possible to prevent a breakdown from being determined on the basis of the output voltage of the gearshift sensor 47 when the clutch C is in the disconnection state. Since the connection state and the disconnection state of the clutch C are greatly different in the operation force which the gear shift lever 20 needs for transmission shift, it is possible to stably acquire the output of the gear shift lever 20 and perform abnormality occurrence determination.

In the above-described embodiment, in the breakdown determination on the gear position sensor 48, whether the clutch C is in the connection state is detected. However, even in the breakdown determination on the gearshift sensor 47, under the condition that the clutch C should be in the connection state, abnormality occurrence determination may be performed.

Also, in the above-described embodiment, the case where the three shift forks 22 to 24 are provided has been described. However, the number of shift forks may be increased or decreased according to the number of gear stages and configuration of the transmission 1.

Also, although the embodiment and the modifications have been described, as other embodiments of the present invention, combinations of all or some components of the embodiment and the modifications may be made.

Also, the embodiment of the present disclosure is not limited to the above-described embodiment, and various changes, replacements, and modifications may be made without departing from the gist of the technical idea of the present invention. Further, if the technical idea of the present invention can be realized in a different manner, owing to the progress of technology or by other derived technology, the present invention may be carried out in the different manner. Accordingly, the claims cover all the embodiments which can fall within the scope of the technical idea of the present invention.

As described above, the present disclosure has the effect that it is possible to prevent unnecessary engine output control attributable to a breakdown of a gearshift sensor or a gear position sensor while using a shifting operation in which an operation on a clutch is not performed, and is useful particularly in transmissions for motorcycles.

What is claimed is:

1. A shift control system for a saddle-type vehicle comprising:
    a gear shift lever configured to be operated by a driver;
    a gearshift sensor configured to detect an operation on the gear shift lever;
    a shift cam configured to rotate according to the operation on the gear shift lever;
    a gear position sensor configured to detect a rotation angle of the shift cam;
    a control device configured to control an output of an engine on the basis of detection results of the gearshift sensor and the gear position sensor;
    a shift fork configured to engage with a lead groove formed in the shift cam and shift according to a position of the lead groove; and
    a positioning mechanism configured to determine a position of the shift cam in a rotation direction of the shift cam by a predetermined biasing force;
    wherein in the case where the gearshift sensor does not detect a detection result according to a detection result of the gear position sensor, or in the case where the gear position sensor does not detect a detection result according to a detection result of the gearshift sensor, the control device determines abnormality occurrence, and stops engine operation control based on the detection results of the gearshift sensor and the gear position sensor on the basis of the abnormality occurrence,
    wherein the lead groove has a shift section for shifting the shift fork and a maintaining section for preventing the shift fork from shifting, according to rotation of the shift cam,
    wherein the positioning mechanism determines the position of the shift cam in the rotation direction by the biasing force, in a state where the shift fork is engaged with a center part of the maintaining section in an extension direction of the maintaining section, and
    wherein when the shift fork is engaged with the maintaining section, the gearshift sensor does not detect the operation on the gear shift lever as a transmission shift operation.

2. The shift control system according to claim 1, wherein the maintaining section extends in a direction parallel with the rotation direction of the shift cam.

3. The shift control system according to claim 1, wherein the gearshift sensor is attached to a link rod for transmitting the operation on the gear shift lever to the shift cam, and detects a load which is applied to the link rod when the gear shift lever is operated.

4. The shift control system according to claim 1,
    wherein the engine includes a clutch for connecting or disconnecting a power of the engine to a drive wheel, and
    wherein when the clutch is in a connection state, the control device performs a determination of the abnormality occurrence.

* * * * *